V. PAONE.
COFFEE AND TEA POT.
APPLICATION FILED DEC. 11, 1911.
1,035,099.
Patented Aug. 6, 1912.
2 SHEETS—SHEET 1.
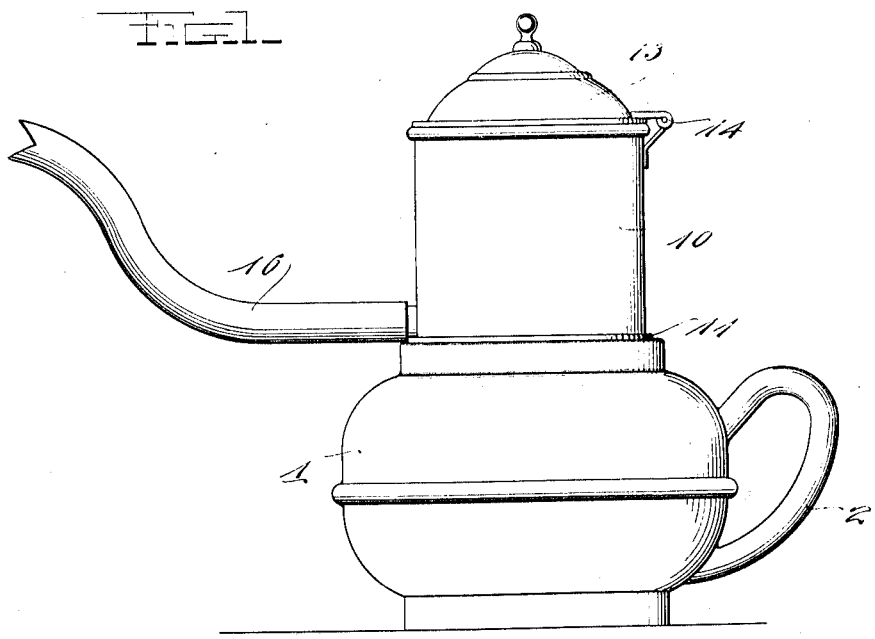
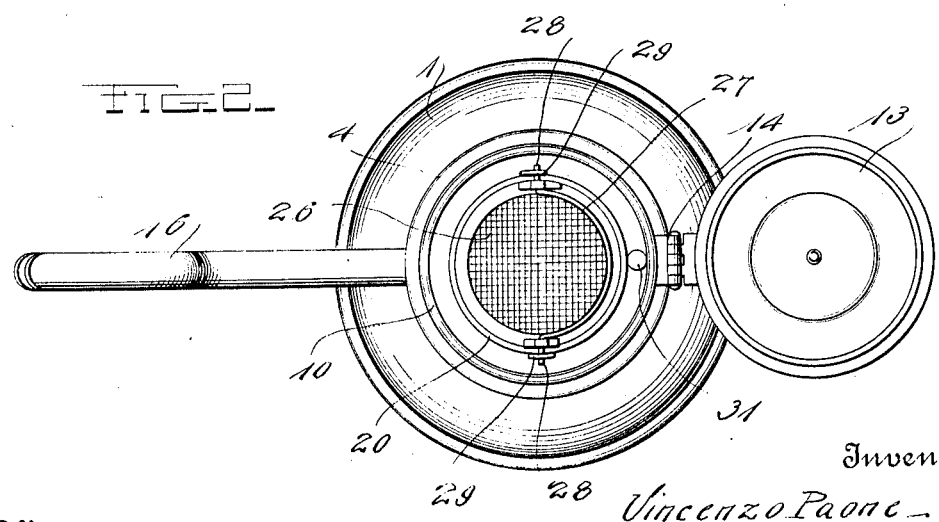
Inventor
Vincenzo Paone
Witnesses

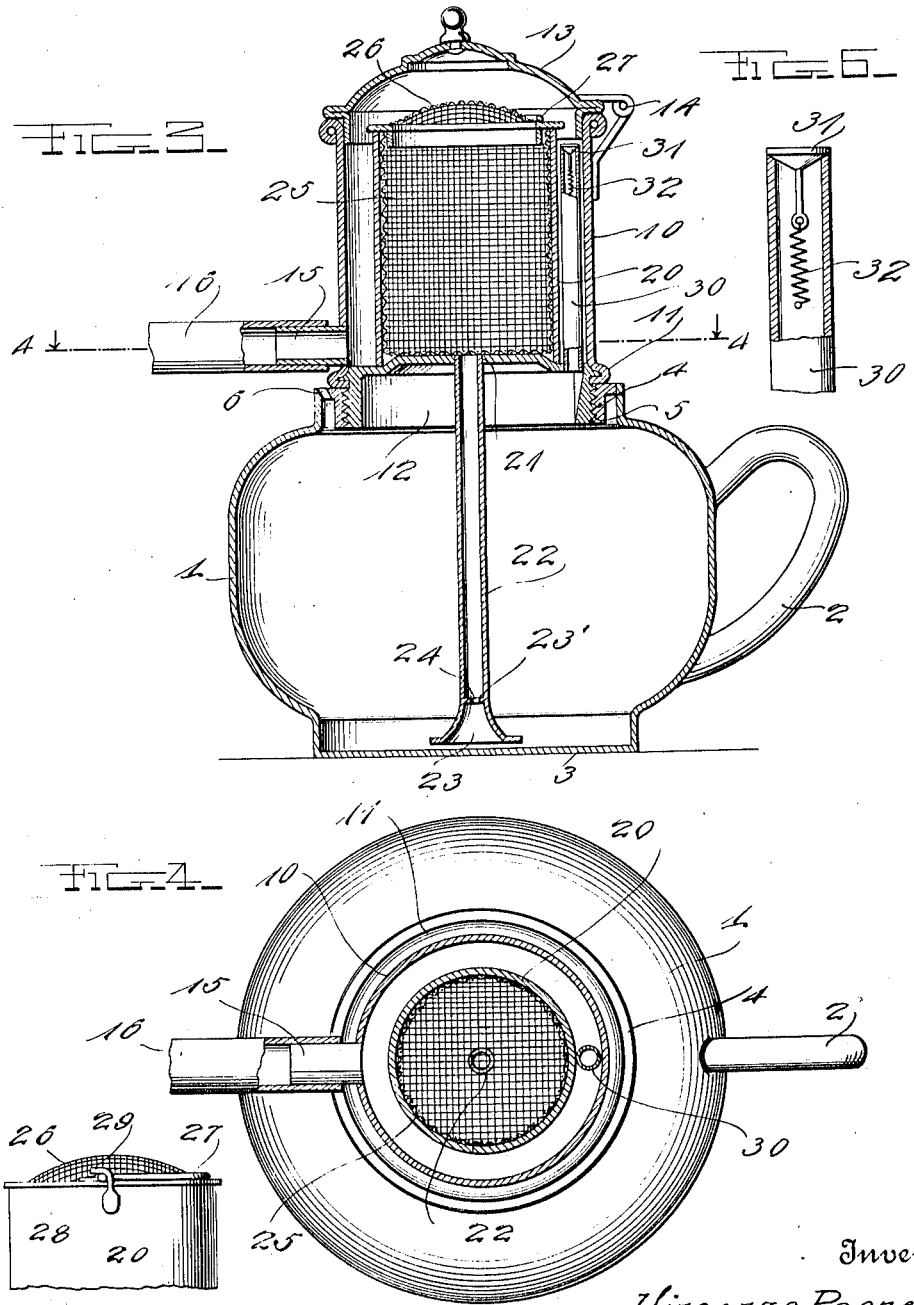

UNITED STATES PATENT OFFICE.

VINCENZO PAONE, OF NEW YORK, N. Y.

COFFEE AND TEA POT.

1,035,099.  Specification of Letters Patent.  Patented Aug. 6, 1912.

Application filed December 11, 1911. Serial No. 665,041.

*To all whom it may concern:*

Be it known that I, VINCENZO PAONE, a citizen of the United States, residing at New York, in the county of New York and State of New York, have invented certain new and useful Improvements in Coffee and Tea Pots; and I do declare the following to be a full, clear, and exact description of the invention, such as will enable others skilled in the art to which it appertains to make and use the same.

This invention relates to domestic cooking vessels, and more especially to coffee and tea pots; and the object of the same is to improve the construction of a vessel of this character.

To this end the invention consists in the details of construction hereinafter more fully described and claimed and shown in the drawings wherein—

Figure 1 is a side elevation and Fig. 2 a plan view of this improved coffee or tea pot, the last-named view showing the cover as opened. Fig. 3 is a central vertical section thereof, and Fig. 4 a horizontal section on the line 4—4 of Fig. 3. Fig. 5 is a side elevation of the upper portion of the container, showing the means for holding the strainer or cage detachably therein, and Fig. 6 is an enlarged sectional detail of the upper portion of the safety valve.

Referring by reference numerals to the drawings, the lower member of this improved cooking vessel consists of a substantially globular body 1 having a handle 2, a closed flat bottom 3, a ring 4 fixed within a rather shallow neck at its open upper end and internally threaded as at 5, and a small vent 6 through this ring at about the point indicated and for a purpose to appear below.

The upper member of this improved cooking vessel comprises a cylindrical body 10 having a flange 11 around its lower end, and beneath the flange an externally threaded extension 12 adapted to engage the threads within the ring around the neck of the lower member, the flange being, however, of such width that when the two members are screwed together it will not cover the vent above referred to. The cylindrical body of the upper member is further provided with a cover 13 which may be hinged as at 14 as shown or otherwise rendered removable, and with a tubular outlet 15 opposite the hinge and on which is swivelly mounted a bent spout 16 which may be rotated on the outlet so as to rise from the same or extend downward for a purpose to appear below.

Within the body of the upper member is fixedly mounted an upright cylindrical container 20 whose wall is by preference concentric with and spaced slightly from that of this member, the lower end of the container being closed by the bottom of this member referred to above, and the bottom being pierced with a central opening 21 with which communicates a percolator tube 22 which depends rigidly from the bottom and has a flared lower end 23 adapted—when the two members are connected—to stand just above the bottom of the lower member as shown in the vertical sectional view. By preference a partition 23' extends across this inlet between its flared lower end and its body, and the partition is pierced with a fine hole 24 although the same result could be obtained by reducing the size of the inlet tube or the size of the opening through the bottom of the upper member. Within said container is removably disposed a cage or strainer consisting of a cylindrical body 25 having a closed bottom and a removable top 26 (all made of foraminous material such as fine wire netting), and 27 designates a bail or handle pivotally secured to the top and having its extremities 28 projecting radially beyond the edges of the same and adapted to engage hooks 29 carried by the upper end of the container and opening in opposite directions. By this means the strainer may be inserted in the container and when the bail is given a twist its projecting ends pass under said hooks and the whole is held in place. The cover is then closed over the top of the strainer as the pivotal arrangement of the bail on the latter permits.

Between the shell of the upper member and the shell of the container is disposed an upright tube 30 opening at its lower end through the bottom of this member and itself normally closed by a safety valve 31 held against its seat by a spring 32.

All parts of this device are by preference of metal, different metals being used at different points as necessity may require, and the size, proportions, details and finish may be safely left to the manufacturer. I may say, however, that the relative proportion of the upper and lower members is by preference about that shown in the drawings so that the lower member will contain considerably more fluid than the upper, which is a necessity of construction in order to permit the successful use of the device in the manner set forth below.

In making coffee or tea with this improved utensil, the operation is as follows: The strainer is removed from the container, its top taken off and in its body is placed the charge of ground or pulverized coffee or of tea leaves, the top replaced, and the entire strainer reinserted within the container and locked in place by turning its top so that the projecting extremities of its bail engage the hooks at the upper end of the container; and then the cover of the upper member is closed. The lower member of this improved pot is then filled about four-fifths full of water (preferably warm), the two members screwed together, and the entire device placed upon the stove or burner. In a short space of time the heat from the latter will be communicated to the water and to the air above it within the lower member, which air expands and a little of it escapes through the vent while the pressure generated by the rest of it will cause the water to rise within the percolator tube. Soon the water becomes sufficiently hot to generate steam, and the action of the steam is the same as that just described for the air, but greater. The size of the vent is such that but little of the steam can escape, and the result will be that hot water is forced up the tube, through the hole in the bottom of the container, and into the interior of the same where it rises within the strainer and through the grounds or tea leaves contained therein until it overflows through the perforated top of the same. Passing thence radially outward in the shape of a strong infusion, it falls into the annular space between the container and the shell of the upper member, and accumulates therein as long as the spout is turned upward; but if the spout be turned downward or even to a horizontal position, and a cup be placed beneath it, the decoction or infusion will flow out of the spout into the cup, and of course the same result will follow if the spout be left in an upright position and the entire pot be lifted by its handle and tilted as usual. As the water in the lower member is converted into steam or consumed and as the excess of steam slowly escapes through the vent, the steam pressure will continue the supply of hot water upward through the percolator but more slowly; and as the water thus fed to the container grows hotter and hotter, the grounds or leaves are more vigorously boiled as the operation proceeds. The result is that, even after one or two cups have been drawn from the annular space which constitutes the reservoir, the device automatically replaces the infusion or decoction thus consumed, and the beverage made by the last of the process is fully as strong as that made at first. The user will soon learn how many cups of the beverage may be made from a pot of the size in question, and therefore will know when the time has arrived that it is necessary to throw out the steeped grounds or leaves and begin again.

If it should happen that the stove or fire on which the pot is placed is exceedingly hot and steam is generated in the lower member more rapidly than is contemplated in the above process, the limited size of the vent and of the inlet hole into the percolator tube and the fact that the upper and lower members are screwed together, are all elements which tend to confine the steam within the lower member; and in order that the same may not burst under the excessive pressure of steam thus generated, I have provided the safety valve described above, and propose to set its spring at such tension that at this time it will open and permit steam to rise from the lower member into the upper whence it can of course escape around the somewhat loose cover or could if necessary blow open the cover if the steam pressure were extremely high. Immediately the valve has acted to relieve the excess steam pressure, it closes automatically, and the operation of making the beverage is resumed. This element of safety I consider an essential feature of this invention, because the lower member—which is in effect a steam boiler—is so constructed that the outlets for both steam and water are extremely small, and its open top is closed by the bottom of the upper member, which member is screwed into the lower member, with the general result that there is no escape for an unusual extra pressure excepting this safety valve, and it would of course be dangerous to have a coffee or tea pot that might explode.

What is claimed as new is:

1. A coffee or tea pot comprising upper and lower members detachably connected, a bottom across the upper member pierced with an inlet opening, a cover and a spout for this member, a container fixed within it upon its bottom and spaced from its wall, a tube rising within said space and opening through said bottom into the lower member, and a perforated cage removably inserted within said container.

2. A coffee or tea pot comprising a lower member having an opening through its top, an upper member detachably mounted in said opening and having a closed bottom pierced with an inlet, a spout opening through its wall above said bottom, and a hinged cover; a cylindrical container within and spaced from the wall of the upper member, a tube rising within such space and opening into the lower member, a spring-closed safety valve within such tube adapted to open upward under steam pressure, a perforated cage removably inserted within said container, and a removable top for the cage.

3. In a coffee or tea pot, the combination with a lower member adapted to contain water, an upper member detachably connected therewith and having a closed bottom pierced with a central inlet hole, a container secured upon said bottom around such hole and spaced from the wall of the upper member, an outlet spout communicating with the lower portion of the space between said upper member and its container, and means for checking the flow of the decoction out of said spout; of an upright tube situated in said space with its lower end opening through the bottom of the upper member and communicating with the upper portion of the space within the lower member, and a spring-pressed safety valve normally closing the upper end of said tube.

In testimony whereof I have hereunto set my hand in presence of two subscribing witnesses.

VINCENZO PAONE.

Witnesses:
 PASQUALE BOVEY,
 FRANK ROMOR.